United States Patent [19]

Spriet et al.

[11] Patent Number: 5,640,000
[45] Date of Patent: Jun. 17, 1997

[54] AUTOMATIC PROCESS FOR LABELLING AND CHECKING BLOOD BAGS RETURNING FROM ANALYSIS AND MACHINE FOR IMPLEMENTING SAME

[75] Inventors: Olivier Spriet, Ronchin; Jean-Pierre Becquart, Wattrelos, both of France

[73] Assignee: Association pour l'Essor de la Transfusion Sanguine Dans la Region du Nord, Lille, France

[21] Appl. No.: 414,942

[22] Filed: Mar. 31, 1995

[30] Foreign Application Priority Data

Mar. 31, 1994 [FR] France ................. 94 03810

[51] Int. Cl.⁶ ............... G06F 17/00; G06K 19/06; A61B 19/00
[52] U.S. Cl. ............... 235/375; 235/491; 604/408; 209/3.3; 209/555
[58] Field of Search ............... 235/375, 491, 235/449; 209/555, 583, 547, 592, 569, 3.1, 3.3; 604/408, 403, 405, 409, 410

[56] References Cited

U.S. PATENT DOCUMENTS

| | | | |
|---|---|---|---|
| 3,619,568 | 11/1971 | Taplin | 101/93 C |
| 3,919,447 | 11/1975 | Kilmer, Jr. et al. | 235/481 X |
| 3,955,678 | 5/1976 | Moyer | 209/583 |
| 4,058,217 | 11/1977 | Vaughan et al. | 209/583 X |
| 4,254,875 | 3/1981 | Varhelyi | 209/547 |
| 4,857,713 | 8/1989 | Brown | 364/101 |
| 5,100,005 | 3/1992 | Noble et al. | 209/583 |
| 5,150,795 | 9/1992 | Nakayama et al. | 209/3.3 |
| 5,166,498 | 11/1992 | Neeley | 235/375 |
| 5,306,269 | 4/1994 | Lewis et al. | 604/408 X |
| 5,314,421 | 5/1994 | Leuenberger | 604/403 |
| 5,392,928 | 2/1995 | Nickey et al. | 209/583 X |
| 5,507,525 | 4/1996 | Leuenberger | 01/408 X |
| 5,514,106 | 5/1996 | D'Silva | 604/408 |

FOREIGN PATENT DOCUMENTS

| | | | |
|---|---|---|---|
| 4028388 | 3/1992 | Germany | 209/547 |
| 0097670 | 6/1984 | Japan | 604/408 |

*Primary Examiner*—Donald T. Hajec
*Assistant Examiner*—Le Thien Minh
*Attorney, Agent, or Firm*—Birch, Stewart, Kolasch & Birch, LLP

[57] ABSTRACT

The chassis (1) of the machine supports a fixed supply table and three successive transfer conveyor belts (3, 14, 19) capable of routing the blood bags towards discharge chutes mounted at the other end. Stations (4, 20) for reading the codes and labels on the blood bags are disposed respectively above the first belt (3) and the third belt (19) on either side of two label appending robots (8). The intermediate belt (14) comprises a weighing unit (16). Application to the labelling of blood bags prior to transfusion.

16 Claims, 3 Drawing Sheets

5,640,000

AUTOMATIC PROCESS FOR LABELLING AND CHECKING BLOOD BAGS RETURNING FROM ANALYSIS AND MACHINE FOR IMPLEMENTING SAME

FIELD OF THE INVENTION

The invention relates to a process and to an automatic machine permitting the real time printing, apposing and checking of labels on blood bags returning from analysis, through interception of the parameters transferred from a central data base.

BACKGROUND OF THE INVENTION

Blood bags have to bear all the particulars, whether coded or in plain language, that are needed to identify the donor and to give information on the characteristics of the blood after it has been analysed. Hitherto, the bags have been marked manually by sticking on suitable labels in accordance with the results of the analyses. These operations, which are long and tedious on account of the checks that have to be carried out, and which do not preclude all risk of error, have led to the development and production of an automatic labelling machine which makes such operations faster and more reliable thanks to the fact that it incorporates checking devices.

SUMMARY OF THE INVENTION

One main object of the present invention is thus an automatic process for labelling and checking blood bags returning from analysis, which process comprises:

moving a blood bag, by means of a first transfer means, to a first station for reading the code as well as the prior analysis of the blood taken;

comparing the data read with that memorized in the central data bank of a computer;

continuing to move the blood bag, by means of the said first transfer means, to an automatic labelling station to which the computer has sent the data needed for printing the labels;

immobilizing the blood bag during the label appending operation;

moving the labelled blood bag, by means of a second transfer means, to a weighing station;

evacuating the blood bag, after verification of the bar code and weighing readings, by means of a third transfer means, to a chute for the reception of the products suitable for transfusion.

As a complement to the process, the blood bag is discharged from the first transfer means if the central data bank of the computer has not recorded the code of the donor and the analysis previously carried out, of the sampled blood, and it is also discharged from the third transfer means to a chute for receiving the rejected products when the code and weighing readings are not correct.

Another main object of the present invention is a machine for implementing the process, a machine the chassis of which supports, at one end, a fixed supply table and several transfer means placed one after the other, capable of routing the blood bags to discharge chutes mounted at the end of the last transfer means, at least two stations for reading the codes and labels on the blood bags being disposed respectively upstream and downstream of at least one label appending robot, the machine being provided with means for removing the bags from their usual travel paths, reacting to anomalies detected by the reading stations, with one transfer means comprising a weighing unit.

Advantageously, the transfer means are conveyors composed of three motor driven, intermittently running endless belts, each one being laterally equipped with photocells suitable for detecting the passage of a blood bag.

According to certain special features of the invention, a first reading station is disposed above the first bent in the vicinity of the supply table and, a second reading station is disposed above the third belt, upstream of the discharge chutes.

Furthermore, one discharge means is composed of a pusher jack capable of being displaced above the first belt downstream of the first reading station and of a discharge chute disposed on one side of the belt, while another discharge means is composed of a jack capable of moving a sliding member for blood bag distribution, placed above the third belt, downstream of the second reading station.

According to an advantageous feature of the invention, the label appending robot is equipped with a fixed boom extending above the first belt and bearing a pivotal arm capable of sliding along the boom, the lower end of the arm being a jack ending in a label holding sucker.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further special features and advantages of the invention will emerge from a study of the following description of an example of an embodiment of the machine, wherein reference will be made to the annexed drawings, in which.

DETAILED DESCRIPTION OF THE PREFERRED EMBODIMENTS

Figure 1:
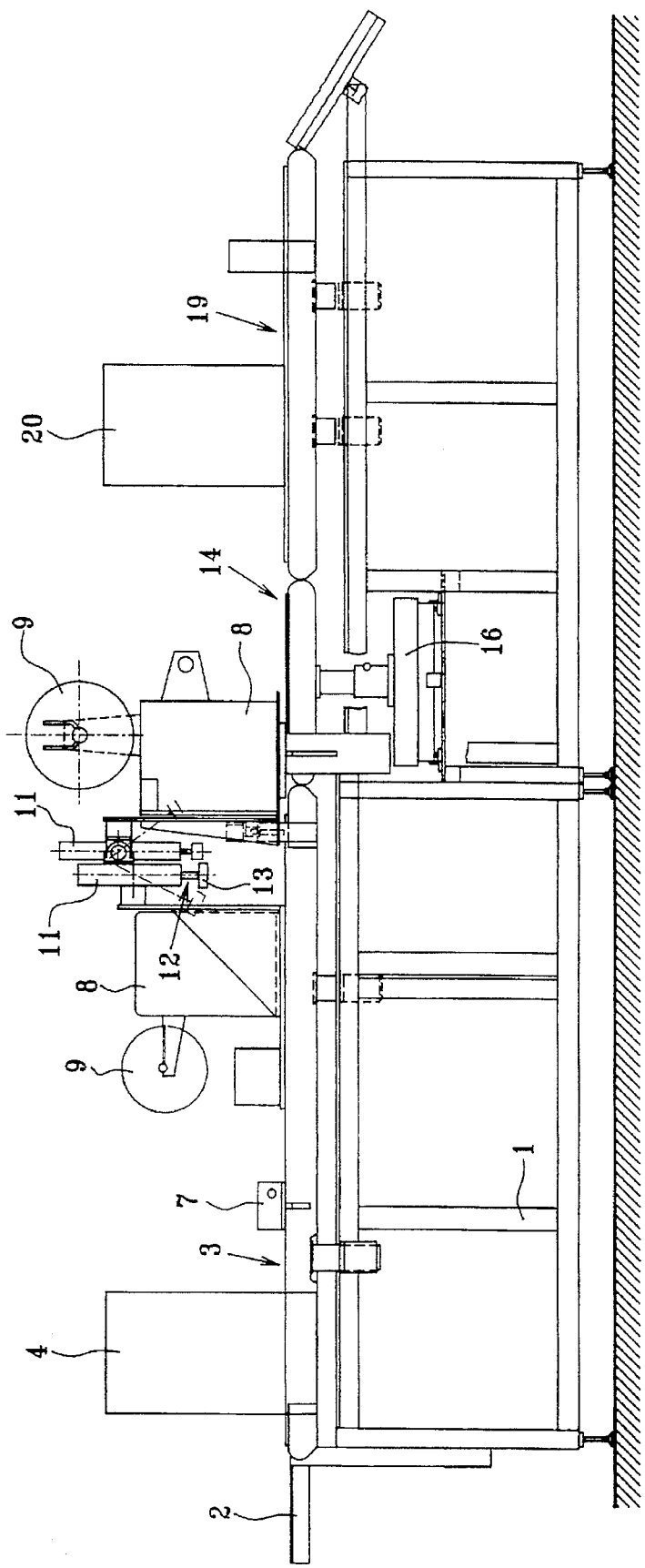
FIG. 1 is a schematic elevation view of the machine.

The machine shown in the figures takes the form of an elongated table whereof the chassis 1, which supports the main components, also serves as a cabinet for housing the electrical and pneumatic cables, piping and equipment and, for this purpose, it can be fitted with access doors, not shown.

At one end of the chassis is located a fixed supply table 2, the surface of which is extended without interruption by that of a first belt 3 formed by a motor driven, intermittently running endless belt. The belt passes beneath a laser reader 4 disposed in the vicinity of the table. Photocells 5 are placed on either side of the belt in the area of the reader so as to detect the passage of a blood bag and trigger the halting of the belt.

Downstream of reader 4, a discharge chute 6 is provided on one side of, and slightly below, the belt. On the opposite side, a pusher jack 7, which is moveable above the belt, is capable of deflecting a blood bag towards the chute, that is to say away from its normal path of travel.

Further along, in the end area of belt 3 are disposed, on either side, two label appending robots 8. Each of them is equipped with a roll of labels 9, a fixed jib 10 extending above the belt and bearing a pivotal arm 11 capable of sliding along the jib. The lower end of the arm is a jack 12 ending in a label holding sucker 13.

The halting of the belt is slaved to the arrival of a blood bag, thanks to a photocell 17. The blood bag is then held, during the label appending operation, by blocking jaws 18 which act as stops and which are retractable. The same blood bag is thus subjected to the operations performed by both of the robots, which can thus each append a different label.

Figure 3:
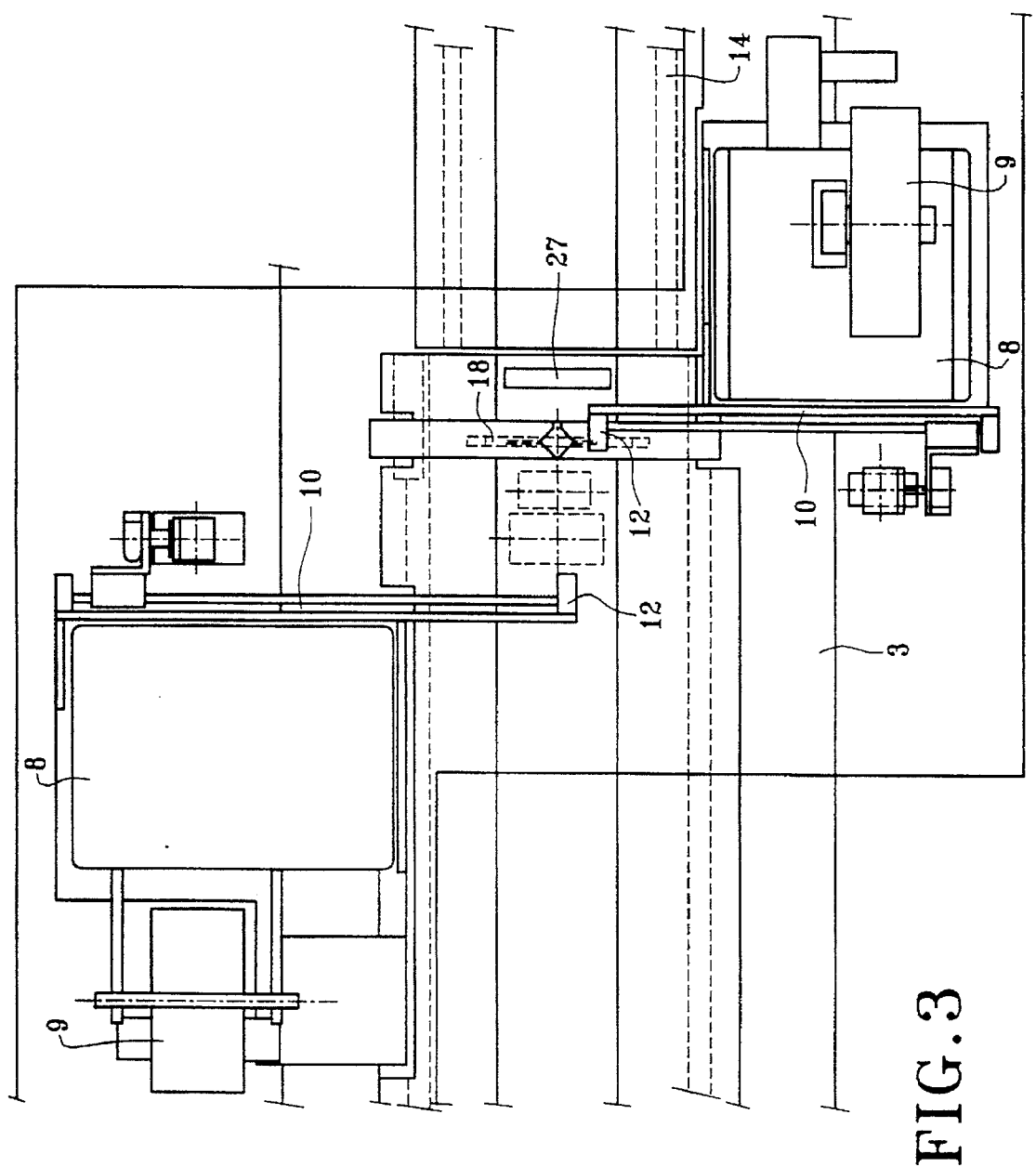
FIG. 3 is a plan view, on a larger scale, of the central portion of the machine.

Finally, above the end of belt 3 is mounted a gluing roll 27, biased back, if necessary, by a counterweight (FIG. 3).

A second intermittently running belt 14, extending on from the preceding one, receives the blood bags released by the label appending robots. This belt 14, which is shorter, is also equipped with photocells, 15.

It forms a blood bag weighing unit and is supported for this purpose by scales 16.

The machine also comprises a third belt 19, extending on from belt 14. It is equipped with a laser reader 20 and a set of photocells 21. Downstream of the exit from reader 20 is mounted a jack 22 suitable for moving a distribution sliding member 23 for guiding the blood bag towards one or the other of two discharge chutes 24, 25 placed at the end of the machine.

Figure 2:
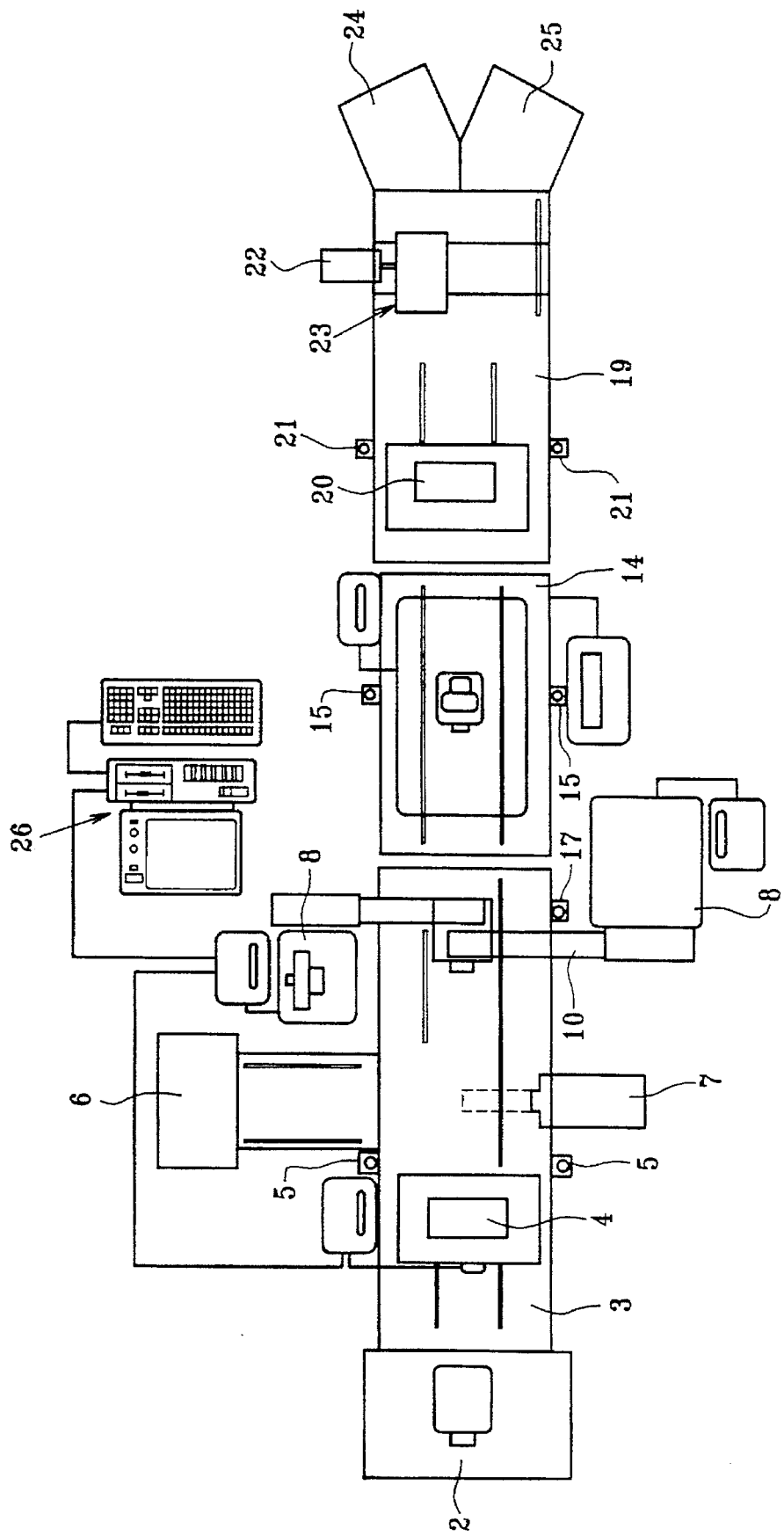
FIG. 2 is a plan view.

The different sensors, such as laser readers 4, 20, scales 16, and label appending robots 8 are connected to a main computer 26 (FIG. 2) provided with applications software and a working data base.

The above-described machine operates as follows:

The operator places the blood bags on input table 2, in random order, as soon as a signal light authorizes him to do so. The bags are placed in turn, and in a given direction with a given side facing upwards, at the head of the belt 3, which moves them along beneath laser reader 4. Photocells 5 then trigger the halting of the belt and initialise reading of the code on the bag.

As soon as the reading has been processed by the computer 26, the blood bag can be routed in two different directions.

Either it is evacuated by jack 7 in the direction of chute 6 after belt 3 has re-started. This is what happens if, for example, the central data base had not recorded the code of the donor and the analysis previously carried out on the sampled blood.

Or it continues along the belt to the next photocell, 17. This is what happens if the central data base is in fact in possession of the corresponding blood analysis and the computer has then been able to "accept" continuation of the operations.

Upon arriving at photocell 17, the blood bag again causes belt 3 to halt, and blocking jaws 18 take up position to hold the bag in place so that it cannot be moved during the labelling operation.

During the time of transit between photocells 5 and 17, the computer will have sent the data to label appending robots 8, each printer of which will have produced a label from dispensing roll 9. Simultaneously, the computer will have authorized the start of a cycle for appending labels on the bag, via an automaton.

The printed label supplied by robot 8 is taken up by sucker 13, and then arm 11 pivots into a vertical position and moves along jib 10 until it is located vertically above the blood bag.

Jack 12 moves the sucker until the label is applied to the bag by blowing. Then, after self-adhesion, the arms return to their initial positions.

During the label appending cycle, a correct execution message is fed back to the automaton, which triggers the opening of jaws 18, the re-starting of belt 3 and the turning on of the signal light at the input to the machine, allowing the operator to introduce a blood bag at the input to the first conveyor belt.

Before leaving the belt 3, the blood bag passes beneath a roller 27 the weight of which completes adherence of the label. The bag is then taken up by the second belt, 14, and halts at photocells 15. Scales 16 becomes stabilized and sends the weight coordinates to the central computer.

Upon reception and validation by the computer, the automaton causes belt 14 to re-start, now transporting the blood bag towards the third belt, 19, which takes up the bag. As soon as photocells 21 are reached, the belt halts, and the blood bag comes to a standstill beneath laser reader 20. The latter reads the bar codes on the bag in their entirety and sends the data to the computer. After processing, four cases can be differentiated:

The reading is correct and the bag is acceptable. Belt 19 re-starts and sliding member 23 guides the bag towards discharge chute 24, which is allocated to correct, checked products, suitable for transfusion.

The reading is correct but the bag is not acceptable. Jack 22 then causes sliding member 23 to be displaced and, after the belt has re-started, it will guide the bag towards chute 25, which is allocated to rejected products.

The reading is incorrect or the code is erroneous. The computer immobilizes the belt and triggers an audible and/or light signal to warn the operator.

The reading is correct, but the weight measured by the scales does not conform to the prescribed limits. The computer immobilizes the belt and triggers an audible and/or light signal to warn the operator, who decides whether or not to release the blood bag in the direction of chute 24.

In all these eventualities, the computer records the data in the data base.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Automatic process for labelling and checking blood bags returning from analysis comprising the steps of:
   moving a blood bag by a first transfer device to a first station for reading data from the blood bag;
   comparing the data read with data stored in a central data bank of a computer;
   continuing to move the blood bag by said first transfer device to an automatic labelling station to which the computer has sent data needed for printing labels;
   appending at least one label to the blood bag in the labelling station;
   immobilizing the blood bag during the label appending operation;
   moving the labelled blood bag by a second transfer device to a weighing station;
   weighing the blood bag at the weighing station;
   verifying data on the blood bag and weight readings; and evacuating the blood bag, after verification of the data and weight readings by a third transfer device to a chute for the reception of products suitable for transfusion.

2. The process according to claim 1, further comprising the step of discharging the blood bag from the first transfer device if the central data bank of the computer has not recorded a code of a donor and previous analysis of the blood sampled in the blood bag.

3. The process according to claim 1, further comprising the step of evacuating the blood bag from the third transfer device to a chute for receiving rejected products when the verifying of the data and the weighing is incorrect.

4. A machine for labelling and checking blood bags comprising;

a chassis having two ends, one end of the chassis supporting a fixed supply table;

several transfer means placed one after the other for routing the blood bags to discharge chutes, the discharge chutes being mounted at an end of a last transfer means, one of the transfer means being a weighing unit;

at least one label appending robot for appending a label to the blood bag, the at least one appending robot being located proximate to at least one of the transfer means;

at least two stations for reading codes and labels on the blood bags, one of the at least two stations being disposed upstream of the at least one label appending robot and the other of the at least two stations being disposed downstream of the at least one label appending robot;

means for removing the bags from travel paths along the transfer means, the means for removing reacting to anomalies detected by the reading stations.

5. The machine according to claim 4, wherein the transfer means are conveyor belts formed by three motor-driven, intermittently running endless belts, each belt being equipped laterally with photocells for detecting passage of a blood bag.

6. The machine according to claim 5, wherein the at least two reading stations comprise a first reading station and a second reading station, the first reading station being disposed above the first belt in the vicinity of the supply table and the second reading station being disposed above the third belt upstream of the discharge chutes.

7. The machine according to claim 6, wherein one means for removing is a pusher jack moveable above the first belt downstream of the first reading station and by a discharge chute disposed on one side of the belt.

8. The machine according to claim 6, wherein one means for removing is a jack for displacing a sliding member for distributing the blood bags, placed above the third belt downstream of the second reading station.

9. The machine according to claim 4, wherein the at least one label-appending robot has a fixed boom extending above a first one of the transfer means, the at least one label-appending robot further having a pivotal arm slidable along the boom, a lower end of the arm being a jack ending in a label holding sucker.

10. The machine according to claim 9, further comprises retractable blocking jaws for holding the blood bag immobilized on the first one of the transfer means during a appending operation.

11. The machine according to claim 4, wherein two robots are provided as the at least one label appending robot, the two robots being disposed on either side of a first one of the transfer means above a terminal area thereof, each robot appending a different label on the same blood bag.

12. The machine according to claim 4, wherein a second one of the transfer means is supported by scales for weighing the blood bags, the second one of the transfer means extending from a first one of the transfer means.

13. The machine according to claim 4, wherein the reading stations, the weighing unit and the at least one label-appending robot are connected to a central computer with application software and a working data base.

14. The machine according to claim 5, wherein a second conveyor belt extends from a first conveyor belt and wherein the second conveyor belt is supported by scales for weighing the blood bags.

15. The machine according to claim 4, wherein the at least two reading stations comprise a first reading stations and a second reading station, the first reading station being disposed above a first one of the transfer means in the vicinity of the supply table and the second reading station being disposed above a third one of the transfer means upstream of the discharge chutes, a second transfer means being provided between the first and third transfer means.

16. The machine according to claim 4, wherein one means for removing is a jack for displacing a sliding member for distributing the blood bags, the jack being above one of the transfer means and being downstream of at least one of the reading stations.

* * * * *